Jan. 7, 1969 T. F. BRIDGES ET AL 3,420,396
INSULATED TANK CONFIGURATION
Filed April 1, 1966 Sheet 3 of 3

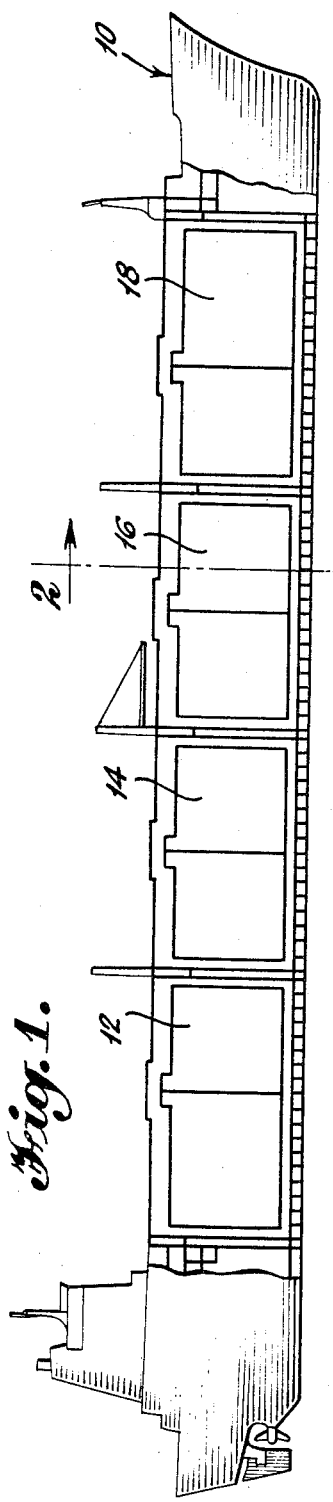
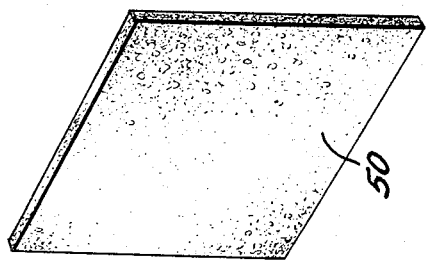
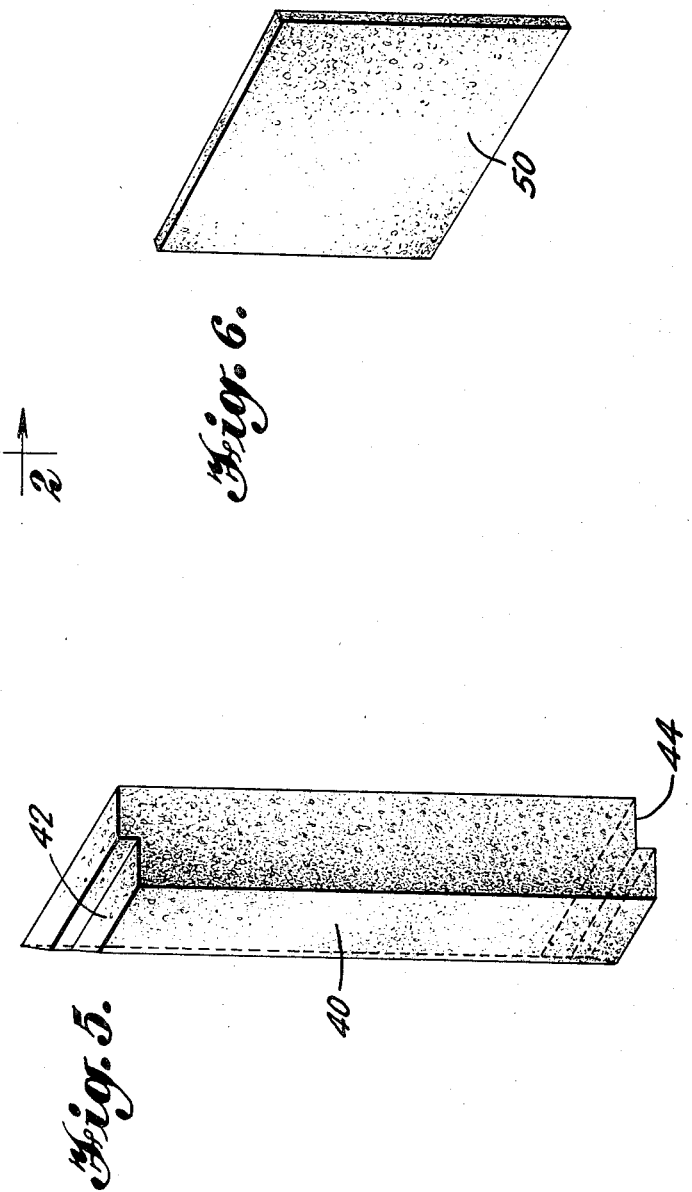
INVENTORS
THOMAS F. BRIDGES,
GEORGE R. KNIGHT, JR.
NORMAN W. PENNEY
BY *Stevens, Davis, Miller & Mosher*
ATTORNEYS

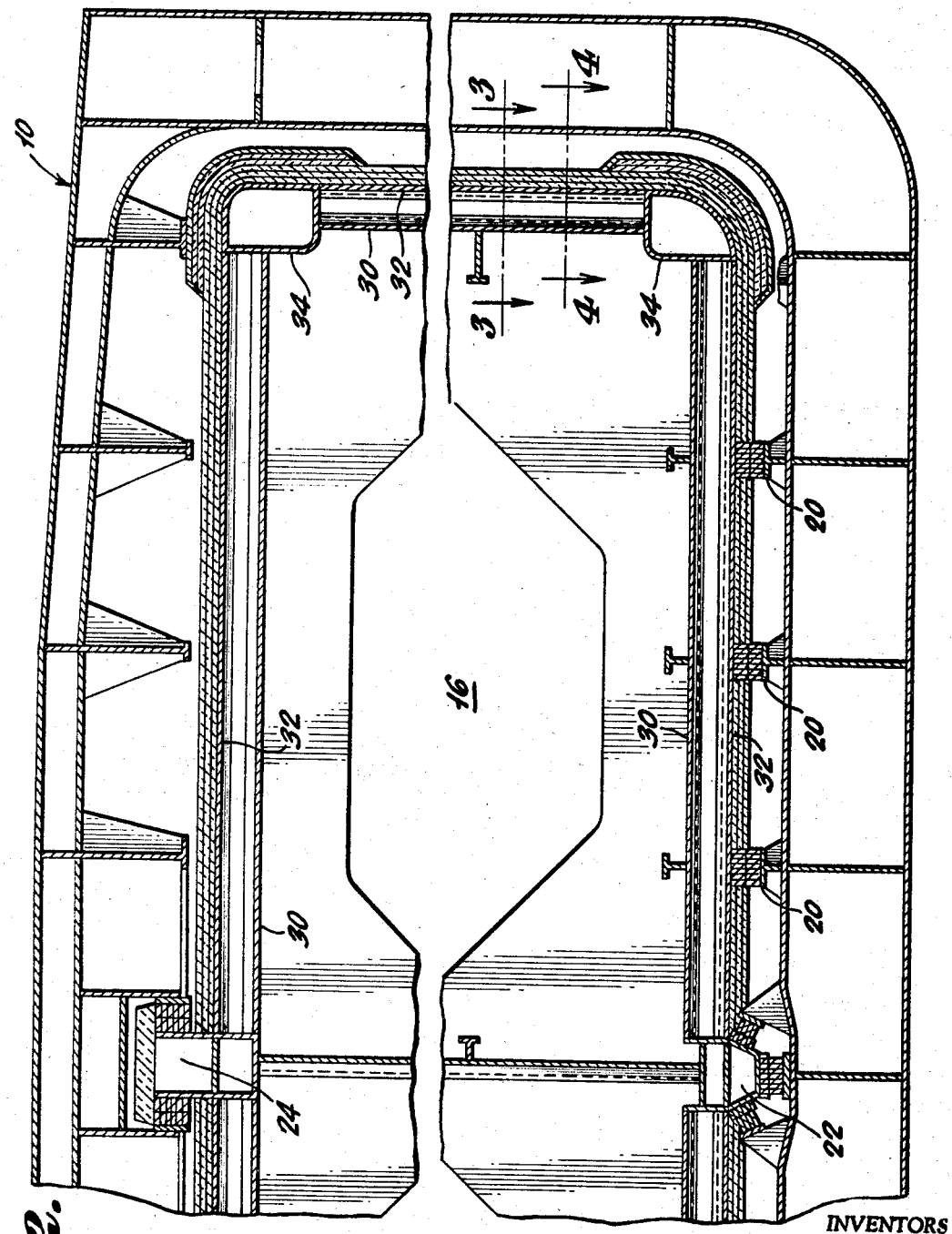

INVENTORS
THOMAS F. BRIDGES,
GEORGE R. KNIGHT, JR.
NORMAN W. PENNEY
BY *Stevens, Davis, Miller & Mosher*
ATTORNEYS United States Patent Office 3,420,396
Patented Jan. 7, 1969

3,420,396
INSULATED TANK CONFIGURATION
Thomas Fort Bridges and George Raymond Knight, Jr., Port Washington, N.Y., and Norman Withers Penney, Ridgewood, N.J., assignors to John J. McMullen, Montclair, N.J.
Filed Apr. 1, 1966, Ser. No. 539,489
U.S. Cl. 220—9      8 Claims
Int. Cl. B65d 25/18

ABSTRACT OF THE DISCLOSURE

A novel insulated tank configuration comprising a tank having an outer vapor tight corrugated wall, insulating blocks fitted into the inwardly directed corrugations of the outer wall, first means for mounting the blocks on the outer wall, at least two layers of insulation applied to the outer face of the outer wall and blocks, the first layer being mounted to one of the outer wall and blocks, and second means for mounting the second layer on the first layer, said first and second means being spaced apart in the plane of the insulating layers to avoid heat transfer paths through the insulation.

---

The present invention relates to a novel construction for a tank adapted to contain a cryogenic product such as liquefied gas, and, more particularly, to a unique insulation arrangement for a tank of the type described.

In the transportation of cryogenic products, such as liquefied gas, various container configurations have been suggested, as well as various insulating arrangements. Nevertheless, the search continues for better and more improved structures. Since the product to be contained is at such a low temperature, e.g., minus 160° C. for liquid methane, proper insulation is essential. At the same time, proper inspection of the container configuration and its various vapor barriers is necessary to assure the integrity of the container by detecting breaks or leaks and repairing same. Despite the advances in this art, known structures have either ignored these criteria or else have imperfectly harmonized them.

It is a principal object of this invention to provide a novel tank construction that overcomes the disadvantages of the prior art by enabling proper inspection and repair while achieving proper, and in fact superior, insulation.

In the preferred form of the invention, the tank construction is described in relation to an ocean-going vessel and constitutes a free standing, double wall tank upon the outside of which is carried a unique buildup of insulation assuring intimate contact with the outer tank wall. The over-all arrangement is such that the tank can be inspected inside, as well as between the double walls, and necessary repairs can be made even to the outside because of the special way in which the insulation is mounted to the tank.

Other and further objects and advantages will become readily evident from the following detailed description of the preferred embodiment of the invention when taken in conjunction with the appended drawings in which:

FIG. 1 portrays an ocean-going vessel equipped with cargo tanks according to the invention, which tanks are suitable for transporting liquefied gas such as methane;

FIG. 2 is a partial vertical section taken along line 2—2 of FIG. 1, illustrating the novel cargo tank construction;

FIG. 5 is a perspective view of the insulation element that is fitted into the spaces of the outer tank wall defined by the corrugations; and FIG. 6 is a perspective view of the insulation element that is used to provide the requisite buildup about the cargo tanks.

Figure 3:
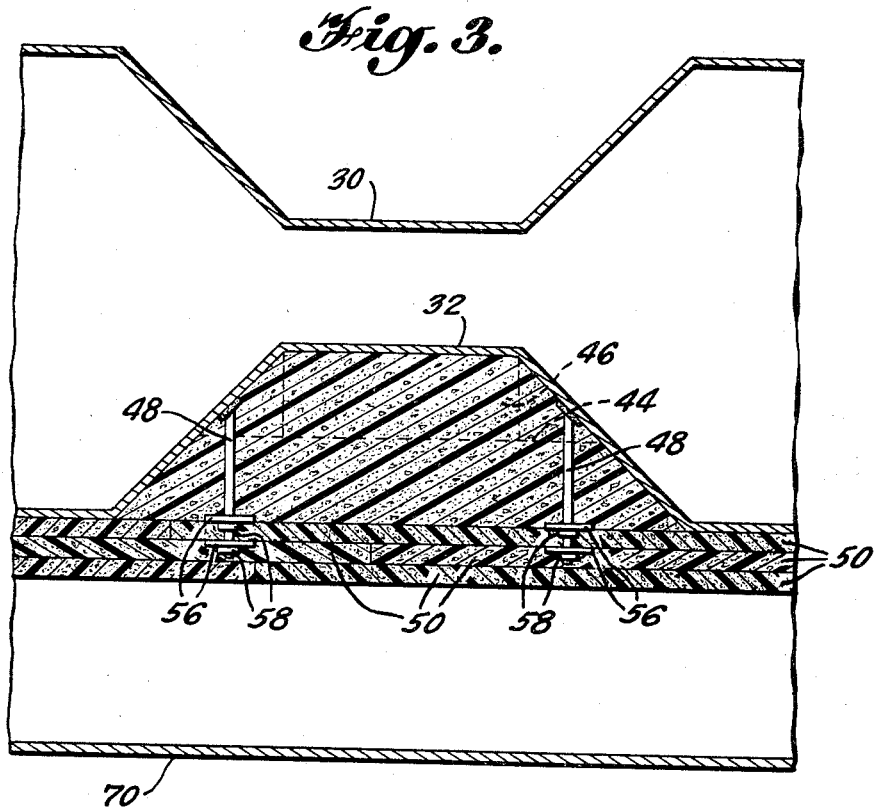
FIG. 3 is a partial horizontal section taken along line 3—3 of FIG. 2.

Referring now to the drawings in detail, FIG. 1 shows a ship generally designated as 10 fitted with four identical cargo tanks 12, 14, 16 and 18. Each cargo tank is free standing, being mounted on supports 20 and suitable keys 22 that permits thermal growth and contraction horizontally in both directions and is free at the top to permit vertical movement also. Key 24 serves as a stabilizing guide during vertical movement.

The tank is constructed with an inner corrugated shell 30 and outer corrugated shell 32 and box girder corners 34 according to the teachings and disclosures of United States application Ser. No. 440,081, filed Mar. 16, 1965, in the name of Ernst A. Nönnecke, owned by the common assignee.

Referring now particularly to FIG. 3, the insulation arrangement will be described. As is evident the insulation is mounted directly to the outer wall 32. Trapezoidal blocks 40 of suitable insulation material, preferably polystyrene foam, are fitted into the corrugations of the outer wall 32. The blocks 40 are shown in detail in FIG. 5 and have cutouts 42 and 44, top and bottom respectively, to enable interfitting of the blocks. Each block 40 is mounted on a lip or plate 46 welded along one edge to outer wall 32.

Rods 48, any number may be used, welded at one end to outer wall 32, extend through and project beyond the block 40. The free ends of rods 48 are serrated, roughened, threaded or the like.

A plurality of layers of insulation, preferably three, is then applied about the tank which, due to fitting of blocks 40, now presents a smooth exterior. Each layer is made up of sheets 50 of insulating material, preferably polyurethane foam of the shape illustrated in FIG. 6. The first layer is carried on the rods 48.

To the projecting ends of rods 48 are applied large diameter washers 56 to provide large area bearing surfaces which are pressed tightly against the blocks 40 by nonslip or lock washers 58, which lock on the serrated end of the rods 48. This arrangement holds blocks 40 on outer wall 32. The first layer of insulation also is carried on the projecting ends of rods 48 and is held by a second set of large diameter washers 56 and lock washers 58. Washers 56 are of insulating material such as a phenolic plastic.

Figure 4:
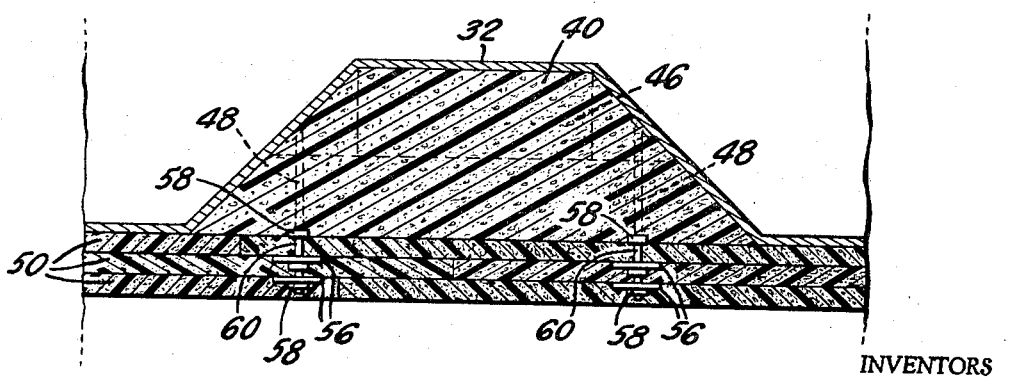
FIG. 4 is a partial horizontal section taken along line 4—4 of FIG. 2.

The second layer of insulation is applied to the first as shown in FIG. 4. Fastening consisting of rods 60 is fitted in the first insulating layer by means of lock washers 58 and bearing washers 56, as shown, so that rods 60 project beyond the first layer. Rods 60 are vertically spaced from rods 48. Sheets of the second layer are applied over the projecting ends of rods 60 and attached by washers 56, 58 as described.

A third layer can be similarly mounted to the second or attached adhesively. If the first two layers provide sufficient insulation, the interface between layers two and three will be warm enough to permit use of adhesives.

The combination of outer wall 32 corrugations, blocks 40 and sheets 50 gives a mean insulating thickness less than the additive thickness of the blocks 40 and sheets 50, but greater than the sheets 50.

The layers are built up as described but carefully so that the butt joints of adjacent sheets 50 in any one layer do not align, overlap or register with the butt joints of sheets 50 in any other layer.

The insulation is applied to the corners using short rods welded at one end to the box girder, like rods 48, to attach or mount the first layer. The remaining layers are built up as previously described using rods and washers. The insulation at the corners is reinforced by building up additional layers in the same manner as described, having the configurations as shown in FIG. 2 and extending beyond the corners generally shown.

A vapor barrier such as plastic sheeting or a metal foil can be applied to the outside of the insulation.

The ship structure is shown in FIG. 3 as bulkhead 70 spaced from the outer insulating layer.

Although the invention has been described in terms of a preferred embodiment, changes and modifications can be made which do not depart from the spirit or contemplation of the invention. Such are deemed to be within the purview of the invention.

What is claimed is:

1. A novel insulated tank configuration comprising a tank having an outer vapor tight corrugated wall, insulating blocks fitted into the inwardly directed corrugations of the outer wall, first means for mounting the blocks on the outer wall, at least two layers of insulation applied to the outer face of the outer wall and blocks, the first layer being mounted to one of the outer wall and blocks, and second means for mounting the second layer on the first layer, said first and second means being spaced apart in the plane of the insulating layers to avoid heat transfer paths through the insulation.

2. A novel insulated tank configuration as recited in claim 1 wherein said first means includes rods attached at one end to the outer wall and projected through the blocks and fastenings applied to the rods bearing against the blocks.

3. A novel insulated tank configuration as recited in claim 1 wherein plates are attached to the outer wall as supports for the blocks.

4. A novel insulated tank configuration as recited in claim 1 wherein said second means includes rods mounted at one end to the first layer and extending through the second, and fastenings applied to the rods bearing against the second layer.

5. A novel insulated tank configuration as recited in claim 1 wherein the layers are comprised of sheets butt mounted with the butt joints of the layers being staggered.

6. A novel insulated tank configuration as recited in claim 1 wherein the insulated tank is mounted in a ship with the outer surface of the insulation spaced from the surrounding ship structure.

7. A novel insulated tank configuration as recited in claim 1 wherein the corners of the tank are reinforced with an extra thickness of insulation.

8. A novel insulated tank configuration as recited in claim 1 wherein a vapor barrier is applied over the outer surface of the insulation.

References Cited

UNITED STATES PATENTS

| 2,800,243 | 7/1957 | Ondrejka | 220—15 |
| 2,869,751 | 1/1959 | Klope et al. | 220—15 |
| 3,150,794 | 9/1964 | Schlumberger et al. | 220—9 |
| 3,158,459 | 11/1964 | Guilhem | 220—15 X |

FOREIGN PATENTS

| 1,354,617 | 1/1964 | France. |

THERON E. CONDON, *Primary Examiner.*

J. R. GARRETT, *Assistant Examiner.*

U.S. Cl. X.R.

220—83, 72